United States Patent
Lu et al.

(10) Patent No.: US 11,617,366 B2
(45) Date of Patent: Apr. 4, 2023

(54) SOLVENTS FOR AGRICULTURAL APPLICATIONS AND PESTICIDE FORMULATIONS

(71) Applicant: Dow Global Technologies LLC, Midland, MI (US)

(72) Inventors: Wei Lu, Shanghai (CN); Xin Jiang, Shanghai (CN); Hua Ren, Shanghai (CN); Ling Zhong, Shanghai (CN); Jianhai Mu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 172 days.

(21) Appl. No.: 16/638,418

(22) PCT Filed: Nov. 3, 2017

(86) PCT No.: PCT/CN2017/109248
§ 371 (c)(1),
(2) Date: Feb. 11, 2020

(87) PCT Pub. No.: WO2019/084896
PCT Pub. Date: May 9, 2019

(65) Prior Publication Data
US 2021/0378236 A1    Dec. 9, 2021

(51) Int. Cl.
*A01N 25/04* (2006.01)
(52) U.S. Cl.
CPC .................... *A01N 25/04* (2013.01)
(58) Field of Classification Search
None
See application file for complete search history.

(56) References Cited

U.S. PATENT DOCUMENTS

| | | | |
|---|---|---|---|
| 9,196,195 B2 | 11/2015 | Tamura | |
| 2014/0003157 A1 | 1/2014 | Mui et al. | |

FOREIGN PATENT DOCUMENTS

| | | | | |
|---|---|---|---|---|
| CN | 101971824 | | 2/2011 | |
| CN | 102283195 | | 12/2011 | |
| EP | 2790500 B | | 10/2014 | |
| JP | S5947268 A | | 3/1984 | |
| JP | H03284651 A | | 12/1991 | |
| JP | H11116994 A | | 4/1999 | |
| WO | 1998000008 | | 1/1998 | |
| WO | 2005000023 | | 1/2005 | |
| WO | 2007140332 | | 12/2007 | |
| WO | 2010078852 | | 7/2010 | |
| WO | 2015067524 A1 | | 5/2015 | |
| WO | WO-2016170784 A1 | * | 10/2016 | ............... C05G 5/23 |
| WO | WO-2017097882 A1 | * | 6/2017 | ............. A01N 25/04 |

OTHER PUBLICATIONS

Y. Kozuki, A predictable solubility tool for pesticide emulsifiable concentrate formulations, 2009, Journal of ASTM International, vol. 6. No. 9, pp. 1-9 (Year: 2009).*
Kozuki, "A predictive solubility tool for pesticide emulsifiable concenliale formulation ASTM Special Technical Publication", 2009, p. 70-76.
Kozuki, "A predictive solubility tool for pesticide emulsifiable concentrate formulation ASTM Special Technical Publication" 2009, 70-76, 2009.
PCT/CN2017/109248, Search Report and Written Opinion dated May 21, 2018.

* cited by examiner

Primary Examiner — Abigail Vanhorn
Assistant Examiner — Ali S Saeed

(57) ABSTRACT

Embodiments of the present invention relate to solvents for pesticides and pesticide formulations. In one aspect, a solvent for pesticides comprises (a) an ether ester of Formula 1:

(Formula 1)

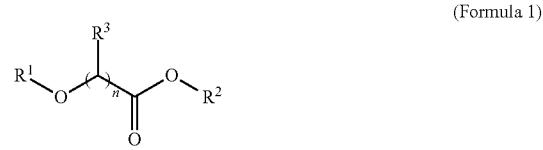

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$$R^4—C(O)—NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms.

5 Claims, No Drawings

SOLVENTS FOR AGRICULTURAL APPLICATIONS AND PESTICIDE FORMULATIONS

FIELD

The present invention relates to solvents for agricultural applications (e.g., pesticides) and to pesticide formulations.

INTRODUCTION

High polarity solvents play a critical role in the preparation of pesticide formulations by dissolving active ingredients to make high concentration products. Commonly used high polarity solvents include, for example, N-methyl pyrrolidone (NMP) or dimethyl sulfoxide (DMSC)), which provide excellent dissolution performance with various active ingredients. However, some highly polar solvents have reproductive toxicity or other toxicity which drive global safety and regulatory concerns.

It would be desirable to have new solvents for agricultural applications (e.g., pesticides) that have good dissolution properties for a variety of active ingredients while also having a good environmental profile.

SUMMARY

The present invention provides solvents for agricultural applications, such as pesticides, that, in some embodiments, have good dissolution properties for a variety of active ingredients.

In one aspect, the present invention provides a solvent for pesticides that comprises (a) an ether ester of Formula 1:

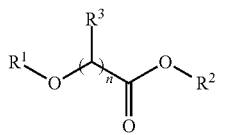

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$R^4$—C(O)—NR$^5$R$^6$      (Formula 2)

wherein $R^4$ is an alkyl group having 1 to 4 carbon atoms, and wherein $R^5$ and $R^6$ are each independently an alkyl group having 1 to 3 carbon atoms.

In another aspect, the present invention provides a solvent for pesticides that consists essentially of (a) an ether ester of Formula 1:

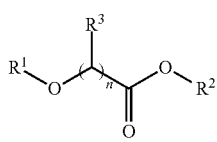

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$R^4$—C(O)—NR$^5$R$^6$      (Formula 2)

wherein $R^4$ is an alkyl group having 1 to 4 carbon atoms, and wherein $R^5$ and $R^6$ are each independently an alkyl group having 1 to 3 carbon atoms.

In another aspect, the present invention provides a pesticide formulation that comprises a solvent according to any of the embodiments of the present invention disclosed herein and a pesticide.

In another aspect, the present invention provides a pesticide formulation that comprises (a) 5 to 30 weight percent of the ether ester of Formula 1; (b) 30 to 90 weight percent of the polar amide of Formula 2; (c) 2 to 70 weight percent of a pesticide; and (d) 3 to 20 weight percent of an emulsifier.

These and other embodiments are described in more detail in the Detailed Description.

DETAILED DESCRIPTION

As used herein, "a," "an," "the," "at least one," and "one or more" are used interchangeably. Thus, for example, an aqueous composition that includes particles of "a" hydrophobic polymer can be interpreted to mean that the composition includes particles of "one or more" hydrophobic polymers.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Solvent" and like terms mean a substance that is capable of dissolving another substance (i.e., a solute) to form an essentially uniformly dispersed mixture (i.e., solution) at the molecular or ionic size level.

Embodiments of the present invention relate to solvents for pesticides. In some embodiments, a solvent for pesticides comprises (a) an ether ester of Formula 1:

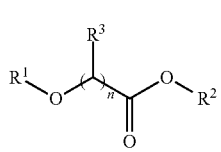

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$$R^4-C(O)-NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms. In some embodiments, $R^4$ of the polar amide of Formula 2 is a methyl group or an ethyl group. The polar amide, in some embodiments, is N,N-diethyl acetamide or N,N-dimethyl propanamide. In some embodiments, $R^1$ and $R^2$ of the ether ester of Formula 1 are ethyl groups, $R^3$ is hydrogen, and n is 2. The solvent, in some embodiments, comprises up to 20 weight percent of the ether ester based on the total weight of the solvent.

In some embodiments, a solvent for pesticides consists essentially of (a) an ether ester of Formula 1:

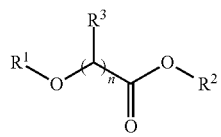
(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$$R^4-C(O)-NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms. In some embodiments, $R^4$ of the polar amide of Formula 2 is a methyl group or an ethyl group. The polar amide, in some embodiments, is N,N-diethyl acetamide or N,N-dimethyl propanamide. In some embodiments, $R^1$ and $R^2$ of the ether ester of Formula 1 are ethyl groups, $R^3$ is hydrogen, and n is 2. The solvent, in some embodiments, comprises up to 20 weight percent of the ether ester based on the total weight of the solvent.

Embodiments of the present invention also relate to pesticide formulations. In some embodiments, a pesticide formulation comprises a solvent according to any of the embodiments of the present invention disclosed herein and a pesticide. In some embodiments, the pesticide comprises one or more of abamectin, tebuconazole, difenoconazole, triazolone, quizalofop-p-ethyl, myclobutanil, diafenthiuron, pyraclostrobin, bifenthrin, buprofezin, and beta-cypermethrin. In some embodiments, the pesticide formulation further comprises an emulsifier. A pesticide formulation, in some embodiments, comprises (a) 5 to 30 weight percent of the ether ester of Formula 1; (b) 30 to 90 weight percent of the polar amide of Formula 2; (c) 2 to 70 weight percent of a pesticide; and (d) 3 to 20 weight percent of an emulsifier.

Solvents for Pesticides

Solvents for pesticides according to some embodiments of the present invention comprise (a) an ether ester of Formula 1:

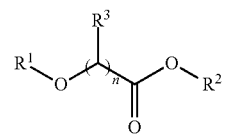
(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) a polar amide of Formula 2:

$$R^4-C(O)-NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms, (1) Ether Ester The first component of solvents for pesticides of the present invention consists of, or is, an ether ester of Formula 1:

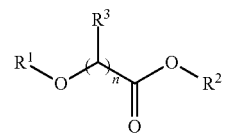
(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6. In some embodiments, $R^1$ and $R^2$ are ethyl groups, $R^5$ is hydrogen, and n is 2.

In one embodiment the ether ester is ethyl-3-ethoxy propionate and is commercially available from The Dow Chemical Company as UCAR™ Ester EEP.

In some embodiments, solvents of the present invention comprise or consist essentially of up to 25 weight percent of the ether ester. Solvents of the present invention, in other embodiments, comprise or consist essentially of up to 20 weight percent of the ether ester. In some embodiments, solvents of the present invention comprise or consist essentially of 15 to 20 weight percent of the ether ester.

(2) Polar Amide

The second component of solvents for pesticides of the present invention consists of, or is, a polar amide of Formula 2:

$$R^4-C(O)-NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms. In some embodiments, $R^4$ of the polar amide of Formula 2 is a methyl group or an ethyl group.

The polar amide, in some embodiments, is N,N-diethyl acetamide (CAS Number 685-91-6) or N,N-dimethyl propanamide (CAS Number 758-96-3). In some embodiments, the polar amide is N,N-dimethyl propanamide.

In some embodiments, solvents of the present invention comprise or consist essentially of up to 90 weight percent of the polar amide. Solvents of the present invention, in other embodiments, comprise or consist essentially of 60 to 90 weight percent of the polar amide. In some embodiments, solvents of the present invention comprise or consist essentially of 70 to 85 weight percent of the polar amide.

Solvents of the present invention are made using known equipment and known techniques. The individual components of the solvent are commercially available, liquid at ambient conditions (23° C. and atmospheric pressure), and can simply be mixed with one another using conventional mixing equipment and standard blending protocols. The components can be added to one another in any order including simultaneously.

In one embodiment the solvent for pesticides is a blend consisting of, or consisting essentially of, the ether ester of Formula 1 (as described above) as the first component and the polar amide of Formula 2 (as described above) as the second component.

In one embodiment the solvent for pesticides is a blend consisting of, or consisting essentially of, ethyl-3-ethoxy propionate and the polar amide of Formula 2 (as described above).

In one embodiment the solvent for pesticides is a blend consisting of, or consisting essentially of, the ether ester of Formula 1 (as described above) as the first component and N,N-diethyl acetamide as the second component.

In one embodiment the solvent for pesticides is a blend consisting of, or consisting essentially of, the ether ester of Formula 1 (as described above) as the first component and N,N-dimethyl propanamide as the second component.

In one embodiment the solvent for pesticides is a blend consisting of, or consisting essentially of, ethyl-3-ethoxy propionate and N,N-diethyl acetamide.

In one embodiment the solvent for pesticides is a blend consisting of, or consisting essentially of, ethyl-3-ethoxy propionate and N,N-dimethyl propanamide as the second component.

Pesticide Formulations

In some embodiments, solvents of the present invention are useful in forming pesticide formulations of the present invention. Pesticide formulations according to the present invention comprise a pesticide and a solvent according to any of the embodiments of solvents for pesticides disclosed herein. These pesticides include, but are not limited to, one or more of abamectin, tebuconazole, difenoconazole, triazolone, quizalofop-p-ethyl, myclobutanil, diafenthiuron, pyraclostrobin, bifenthrin, buprofezin, and beta-cypermethrin.

In some embodiments, the pesticide formulation further comprises an emulsifier. Examples of emulsifiers that can be used in embodiments of pesticide formulations of the present invention include, for example, TERGITOL™ 15-S-9, DOWFAX™ D-800, DOWFAX™ 2A1, and TRITON™ GR-7M, each of which are available from The Dow Chemical Company.

In some embodiments, a pesticide formulation of the present invention comprises 5 to 30 weight percent of the ether ester of Formula 1 (as described above), 30 to 90 weigh t percent of the polar amide of Formula 2 (as described above), 2 to 70 weight percent of one or more pesticides, and 3 to 20 weight percent of an emulsifier, each based on the total weight of the pesticide formulation.

In some embodiments, a pesticide formulation of the present invention comprises 5 to 30 weight percent of ethyl-3-ethoxy propionate, 30 to 90 weight percent of the polar amide of Formula 2 (as described above), 2 to 70 weight percent of one or more pesticides, and 3 to 20 weight percent of an emulsifier, each based on the total weight of the pesticide formulation.

In some embodiments, a pesticide formulation of the present invention comprises 5 to 30 weight percent of the ether ester of Formula 1 (as described above), 30 to 90 weight percent of N,N-diethyl acetamide, 2 to 70 weight percent of one or more pesticides, and 3 to 20 weight percent of an emulsifier, each based on the total weight of the pesticide formulation.

In some embodiments, a pesticide formulation of the present invention comprises 5 to 30 weight percent of the ether ester of Formula 1 (as described above), 30 to 90 weight percent of N,N-dimethyl propanamide, 2 to 70 weight percent of one or more pesticides, and 3 to 20 weight percent of an emulsifier, each based on the total weight of the pesticide formulation.

In some embodiments, a pesticide formulation of the present invention comprises 5 to 30 weight percent of ethyl-3-ethoxy propionate, 30 to 90 weight percent of N,N-diethyl acetamide, 2 to 70 weight percent of one or more pesticides, and 3 to 20 weight percent of an emulsifier, each based on the total weight of the pesticide formulation.

In some embodiments, a pesticide formulation of the present invention comprises 5 to 30 weight percent of ethyl-3-ethoxy propionate, 30 to 90 weight percent of N,N-dimethyl propanamide, 2 to 70 weight percent of one or more pesticides, and 3 to 20 weight percent of an emulsifier, each based on the total weight of the pesticide formulation.

In some embodiments, a pesticide formulation of the present invention consists of, or consists essentially of, 5 to 30 weight percent of the ether ester of Formula 1 (as described above), 30 to 90 weight percent of the polar amide of Formula 2 (as described above), 2 to 70 weight percent of one or more pesticides, and 3 to 20 weight percent of an emulsifier, each based on the total weight of the pesticide formulation.

In some embodiments, a pesticide formulation of the present invention consists of, or consists essentially of, 5 to 30 weight percent of ethyl-3-ethoxy propionate, 30 to 90 weight percent of the polar amide of Formula 2 (as described above), 2 to 70 weight percent of one or more pesticides, and 3 to 20 weight percent of an emulsifier, each based on the total weight of the pesticide formulation.

In some embodiments, a pesticide formulation of the present invention consists of, or consists essentially of, 5 to 30 weight percent of the ether ester of Formula 1 (as described above), 30 to 90 weight percent of N,N-diethyl acetamide, 2 to 70 weight percent of one or more pesticides, and 3 to 20 weight percent of an emulsifier, each based on the total weigh t of the pesticide formulation.

In some embodiments, a pesticide formulation of the present invention consists of, or consists essentially of, 5 to 30 weight percent of the ether ester of Formula 1 (as described above), 30 to 90 weight percent of N,N-dimethyl propanamide, 2 to 70 weight percent of one or more pesticides, and 3 to 20 weight percent of an emulsifier, each based on the total weight of the pesticide formulation.

In some embodiments, a pesticide formulation of the present invention consists of, or consists essentially of, 5 to 30 weight percent of ethyl-3-ethoxy propionate, 30 to 90 weight percent of N,N-diethyl acetamide, 2 to 70 weight percent of one or more pesticides, and 3 to 20 weight percent of an emulsifier, each based on the total weight of the pesticide formulation.

In some embodiments, a pesticide formulation of the present invention consists of, or consists essentially of, 5 to 30 weight percent of ethyl-3-ethoxy propionate, 30 to 90 weight percent of N,N-dimethyl propanamide, 2 to 70 weight percent of one or more pesticides, and 3 to 20 weight percent of an emulsifier, each based on the total weight of the pesticide formulation.

In some embodiments, a pesticide formulation of the present invention comprises 10 to 25 weight percent of the ether ester of Formula 1 (as described above), 40 to 85 weight percent of the polar amide of Formula 2 (as described above), 5 to 40 weight percent of one or more pesticides, and 5 to 15 weight percent of an emulsifier, each based on the total weight of the pesticide formulation.

In some embodiments, a pesticide formulation of the present invention comprises 10 to 25 weight percent of ethyl-3-ethoxy propionate 40 to 85 weight percent of the polar amide of Formula 2 (as described above), 5 to 40 weight percent of one or more pesticides, and 5 to 15 weight percent of an emulsifier, each based on the total weight of the pesticide formulation.

In some embodiments, a pesticide formulation of the present invention comprises 10 to 25 weight percent of the ether ester of Formula 1 (as described above), 40 to 85 weight percent of N,N-diethyl acetamide, 5 to 40 weight percent of one or more pesticides, and 5 to weight percent of an emulsifier, each based on the total weight of the pesticide formulation.

In some embodiments, a pesticide formulation of the present invention comprises 10 to 25 weight percent of the ether ester of Formula 1 (as described above), 40 to 85 weight percent of N,N-dimethyl propanamide, 5 to 40 weight percent of one or more pesticides, and 5 to 15 weight percent of an emulsifier, each based on the total weight of the pesticide formulation.

In some embodiments, a pesticide formulation of the present invention comprises 10 to 25 weight percent of ethyl-3-ethoxy propionate, 40 to 85 weight percent of N,N-diethyl acetamide, 5 to 40 weight percent of one or more pesticides, and 5 to 15 weight percent of an emulsifier, each based on the total weight of the pesticide formulation.

In some embodiments, a pesticide formulation of the present invention comprises 10 to 25 weight percent of ethyl-3-ethoxy propionate, 40 to 85 weight percent of N,N-dimethyl propanamide, 5 to 40 weigh t percent of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of the ether ester of Formula 1 (as described above), 40 to 85 weight percent of the polar amide of Formula 2 (as described above), 5 to 40 weight percent, of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of ethyl-3-ethoxy propionate, 40 to 85 weight percent of the polar amide of Formula 2 (as described above), 5 to 40 weight percent of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of the ether ester of Formula 1 (as described above), 40 to 85 weight percent of N,N-diethyl acetamide, 5 to 40 weight percent of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of the ether ester of Formula 1 (as described above), 40 to 85 weight percent of N,N-dimethyl propanamide, 5 to 40 weight percent of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of ethyl-3-ethoxy propionate, 40 to 85 weight percent of N,N-diethyl acetamide, 5 to 40 weight percent of one or more pesticides, and 5 to 15 weight percent of an emulsifier, each based on the total weight of the pesticide formulation.

In some embodiments, a pesticide formulation of the present invention consists of, or consists essentially of, 10 to 25 weight percent of ethyl-3-ethoxy propionate, 40 to 85 weight percent of N,N-dimethyl propanamide, 5 to 40 weight percent of one or more pesticides, and 5 to 15 weight percent of an emulsifier, each based on the total weight of the pesticide formulation.

Optional materials that are not essential to the operability of, but can be included in, the pesticide formulations of this invention include, but are not limited to, antioxidants, colorants, water scavengers, stabilizers, and the like. These materials do not have any material impact on the efficacy of the pesticide formulation. These optional materials are used in known amounts, e.g., 0.10 to 5, or 4, or 3, or 2, or 1, weight percent based on the weight of the solvent, and they are used in known ways.

Pesticide formulations can be prepared using techniques known to those of skill in the art. For example, the active ingredient (pesticide) can be dissolved in a solvent, and then emulsifiers or other conventional additives can be added.

Some embodiments of the invention will now be described in detail in the following Examples.

EXAMPLES

The following examples are given to illustrate the invention and should not be construed as limiting its scope. All parts and percentages are by weight unless otherwise indicated.

The following components in Table 1 are evaluated for performance as a solvent, or as a component of a solvent, for pesticides:

TABLE 1

| Component | Chemical |
| --- | --- |
| Ether Ester of Formula 1 (Ether Ester) | Ethyl-3-ethoxy propionate |
| Polar Amide of Formula 2 (DEAC) | N,N-diethyl acetamide |
| Polar Amide of Formula 2 (DMPA) | N,N-dimethyl propanamide |
| DMSO | Dimethyl sulfoxide |
| DMAA810 | Mixture of N,N-dimethyldecanamide and N,N-dimethylcaprylamide |

The ethyl 3-ethoxypropionate is UCAR™ Ester EEP available from The Dow Chemical Company. The DMSO is from Sinopharm, Co. DMAA810 is from Wilmar International Limited. The DEAC, DMPA, and DMSO are commercial grade solvents that are commercially available from a variety of suppliers.

The solubility of various pesticides in these solvents or solvent components are evaluated. The pesticides are shown in Table 2:

TABLE 2

| Components | Supplier |
|---|---|
| Abamectin | Tianyuan Biochemical Co. |
| Tebuconazole | Liannong Chemical Co. |
| Difenoconazole | Suli Chemical Co. |
| Triazolone | Qizhou Chemical Co. |
| Quizalofop-p-ethyl | Jingbo Chemical Co. |
| Myclobutanil | Shengya Chemical Co. |
| Diafenthiuron | Suli Chemical Co. |
| Pyraclostrobin | Shentai Chemical Co. |
| Bifenthrin | Lier Chemical Co. |
| Buprofezin | Lier Chemical Co. |
| Beta-cypermethrin | Tianyuan Biochemical Co. |

Each pesticide powder is added by solvent in 2% stepwise increments to the final pesticide concentration. Each pesticide reaches a concentration where the pesticide powder is not dissolved by the solvent. The concentration just prior to the concentration where the pesticide powder is not dissolved is shown in Table 3. Thus, the data in Table 3 reflects a solubility that is no more than 2% lower than the actual solubility.

TABLE 3

| Active Ingredient | DMSO (weight %) | DMAA810 (weight %) | DEAC (weight %) | DMPA (weight %) |
|---|---|---|---|---|
| Abamectin | 21 | 38 | 50 | 51 |
| Tebuconazole | 32 | 37 | 51 | 54 |
| Difenoconazole | 39 | 31 | 45 | 53 |
| Triazolone | 43 | 39 | 54 | 58 |
| Quizalofop-p-ethyl | 16 | 24 | 42 | 48 |
| Myclobutanil | 57 | 42 | 57 | 58 |
| Diafentbiuron | 18 | 29 | 43 | 45 |
| Pyraclostrobin | 40 | 42 | 54 | 63 |
| Bifenthrin | 7 | 33 | 50 | 47 |
| Buprofezin | 1 | 22 | 31 | 33 |
| Beta-cypermethrin | 10 | 34 | 56 | 61 |

As shown in Table 3, DEAC and DMPA exhibit stronger dissolving power than comparative solvents DMSO and DMAA810, not just for one active ingredient, but for each of the active ingredients evaluated. DEAC and DMPA are each polar amides that fall within Formula 2 (as described above) and are thus potential components of solvents for pesticides according to embodiments of the present invention.

A number of pesticide formulations are prepared and evaluated for their dissolving performance and stability. The active ingredient is an amide-based pesticide. The following pesticide formulations are prepared as emulsifiable concentrates, each having ~6 weight percent of the active ingredient.

TABLE 4

| Component | Comparative Ex. A | Comparative Ex. B | Inventive Ex. 1 | Inventive Ex. 2 |
|---|---|---|---|---|
| Active Ingredient (95.0% purity) | 0.63 g | 0.63 g | 0.63 g | 0.63 g |
| DMSO | 8.37 g | 6.87 g | | |
| DEAC | | | 6.87 g | |
| DMPA | | | | 6.87 g |
| Ether Ester | | 1.5 g | 1.5 g | 1.5 g |

TABLE 4-continued

| Component | Comparative Ex. A | Comparative Ex. B | Inventive Ex. 1 | Inventive Ex. 2 |
|---|---|---|---|---|
| Emulsifier 1 | 0.75 g | 0.75 g | 0.75 g | 0.75 g |
| Emulsifier 2 | 0.25 g | 0.25 g | 0.25 g | 0.25 g |
| Active dissolving status | Well dissolved | Can't dissolve | Well dissolved | Well dissolved |
| 200X dilution, 30%, 2 hours | crystal | NA | <0.01 ml deposit | 0.1 ml deposit |
| Cold storage stability, 0° C., 1 week | crystal | NA | ok | ok |
| Thermal storage stability, 54° C., 2 weeks | ok | NA | ok | ok |

Emulsifier 1 is TERGITOL™ 15-S-9, which is commercially available from The Dow Chemical Company. Emulsifier 2 is TRITON™ GR-7M, which is commercially available from The Dow Chemical Company.

Comparative Example 1 utilizing DMSO provides excellent dissolving performance of the active ingredient, hut exhibits poor stability upon dilution and poor cold storage stability. In Comparative Example 2, the active ingredient is not dissolved in a solvent mixture of DMSO with the Ether Ester. In each of the Inventive Examples, the pesticide formulations provide excellent dissolvability of the active ingredient, stability upon dilution, cold storage stability and thermal storage stability. The solvents used in the Inventive Examples thus dissolve active ingredients at a high concentration while providing excellent stability and a better environmental profile relative to DMSO.

We claim:

1. A solvent for pesticides consisting of:
   (a) 10 to 40 weight percent of an ether ester of Formula 1:

(Formula 1)

wherein $R^1$ and $R^2$ are each independently one of an alkyl group having 1 to 4 carbon atoms or an aryl group, wherein $R^3$ is hydrogen, methyl, or ethyl, and wherein n is 1 to 6; and (b) 60 to 90 weight percent of a polar amide of Formula 2:

$$R^4\text{—C(O)—}NR^5R^6 \quad \text{(Formula 2)}$$

wherein $R^4$ is an alkyl group having 1 to 4 carbon atoms, and wherein $R^5$ and $R^6$ are each independently an alkyl group having 1 to 3 carbon atoms.

2. The solvent of claim 1, wherein $R^4$ is a methyl group or an ethyl group.

3. The solvent of claim 1, wherein the polar amide is N,N-diethyl acetamide or N,N-dimethyl propanamide.

4. The solvent of claim 1, wherein $R^1$ and $R^2$ are ethyl groups, wherein $R^3$ is hydrogen, and wherein n is 2.

5. The solvent for pesticides of claim 1, wherein the polar amide is one or more of N,N-diethyl acetamide and N,N-dimethyl propanamide, and wherein the ether ester is ethyl-3-ethoxy propanoate.

* * * * *